May 5, 1942.        J. M. WEED        2,281,645
VOLTAGE REGULATOR
Filed Oct. 23, 1940
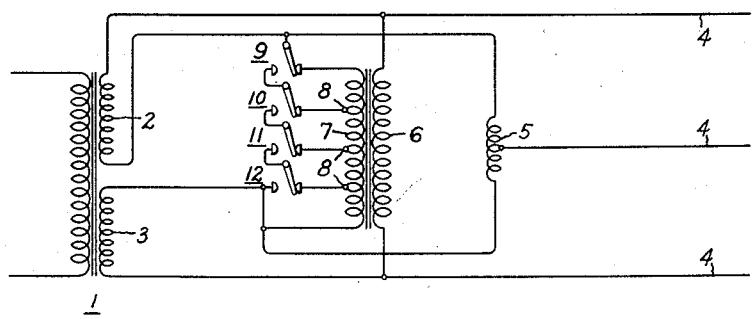
Inventor:
James M. Weed,
by Harry E. Dunham
His Attorney.

Patented May 5, 1942

2,281,645

UNITED STATES PATENT OFFICE 2,281,645

VOLTAGE REGULATOR

James M. Weed, Schenectady, N. Y., assignor to General Electric Company, a corporation of New York Application October 23, 1940, Serial No. 362,399

2 Claims. (Cl. 171—119)

This invention relates to voltage regulators and more particularly to improvements in transformer type voltage regulators for alternating-current distribution circuits.

This is an improvement on my application Serial No. 362,398, filed October 23, 1940, and assigned to the assignee of the present application. In that case there are disclosed a number of transformer type regulators for insertion between the three-wire secondary winding of a distribution transformer and a single-phase three-wire secondary load circuit. Preferably, the regulator is located as near the load as possible so as to give as close voltage regulation as possible.

In those regulators the problem of minimizing or eliminating voltage differences between the neutral point of the secondary winding of the distribution transformer and the neutral point of the regulating transformer was solved by the use of separate sets of taps located on the regulating transformer on opposite sides of the neutral point.

In accordance with the present invention I provide a novel and simple combination of distribution transformer and regulating transformer whereby the neutral voltage is automatically maintained exactly midway between the voltage of the outer conductors of the three-wire secondary circuit with but a single set of taps and tap-changing switches on the regulating transformer.

An object of the invention is to provide a new and improved voltage regulator.

Another object of the invention is to provide a simple and inexpensive voltage regulator for three-wire secondary distribution circuits.

The invention will be better understood from the following description taken in connection with the accompanying drawing and its scope will be pointed out in the appended claims.

Referring now to the single figure of the accompanying drawing in which I have illustrated diagrammatically an embodiment of my invention, the distribution transformer, shown at 1, is provided with a secondary winding, in two equal parts 2 and 3. The two parts are connected respectively to the outer conductors of a three-wire load circuit 4 and they are interconnected so as to provide a neutral point by means of a mid-tapped auto transformer 5. The regulating transformer has its primary winding 6 connected across the outer conductors of the load circuit 4 and its secondary winding 7 is provided with a plurality of taps 8 connected to tap-changing switches 9, 10, 11 and 12. These switches are single-pole double-throw switches and they may be toggle joint type spring actuated snap switches which are operable either manually or by suitable operating means in response to load circuit voltage. For example, the switches may be operated by the specific actuating means described in my above-identified copending application.

The operation of my invention is as follows: With the switches in the positions illustrated, the maximum voltage of the regulator secondary winding is applied across the terminals of the mid-tapped autotransformer and therefore is applied between the two parts of the secondary of the distribution transformer symmetrically on opposite sides of the neutral point. This voltage may be either a voltage boost or a voltage buck depending upon the polarity of the connections. If now switch 9 is moved to the left the turns of said secondary winding which are between the two uppermost taps will be removed, thus reducing the regulator voltage. Subsequent operation of switches 10, 11 and 12 will successively reduce the regulator voltage inserted between the winding parts 2 and 3 until, with the operation of switch 12, there will be no regulating voltage applied across the reactor 5 and inserted between the winding parts 2 and 3.

With this arrangement it will be seen that the application of the variable voltage from the regulating transformer is symmetrical with respect to the netural point of the secondary load circuit and that this is accomplished by the use of a single set of taps and a single set of tap-changing switches.

The voltage range of the regulating transformer will normally be but a relatively small percentage of the voltage rating of the distribution transformer so that the size of the regulating transformer will be small in comparison with the size of the distribution transformer and these two units, together with the reactor 5, may readily be combined in a single casing or transformer tank.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a distribution transformer having a two-part secondary winding, means for connecting said parts in series and providing a neutral for said secondary winding comprising a mid-tapped autotransformer having its end terminals connected one to a terminal of each of said secondary winding parts, a load circuit connected to the remaining terminals of said secondary winding parts, means for regulating the voltage of said load circuit comprising a regulating transformer excited from said load circuit, said regulating transformer having a maximum output voltage which is a relatively small percentage of the voltage of said secondary winding, and means for connecting the output voltage of said regulating transformer across said autotransformer.

2. In combination, a distribution transformer having two equal secondary windings for energizing respectively the two halves of a three-wire secondary circuit, a mid-tapped autotransformer interconnecting said windings so as to provide a neutral for said circuit, a regulating transformer having its primary winding connected across said secondary circuit and having a tapped secondary winding, and means including tap-changing switches for selectively connecting said autotransformer to different pairs of said taps.

JAMES M. WEED.